106. COMPOSITIONS, COATING OR PLASTIC.
84

UNITED STATES PATENT OFFICE.

CARL J. PATER, OF HARTWELL, OHIO, ASSIGNOR TO THE PHILIP CAREY MANUFACTURING COMPANY, OF LOCKLAND, OHIO, A CORPORATION OF OHIO.

FIRE AND WATER PROOF COMPOSITION.

1,067,542.     Specification of Letters Patent.     Patented July 15, 1913.

No Drawing.     Application filed July 8, 1912. Serial No. 708,212.

*To all whom it may concern:*

Be it known that I, CARL J. PATER, a citizen of the United States, residing at Hartwell, in the county of Hamilton and State of Ohio, have invented certain new and useful Improvements in Fire and Water Proof Compositions, of which the following is a specification.

My invention relates to improvements in fireproof and waterproof composition.

The object of my invention is the production of a thoroughly efficient combined fireproof and waterproof material or composition, which is particularly adapted for use as a fire and waterproof heat insulation for steam pipes, stack linings, boiler coverings, lining for ocean steamers, heated surfaces and the like.

My invention consists in the composition and in the process of making same as herein set forth and claimed.

Articles of manufacture for insulating purposes made of asbestos are fireproof but not waterproof. The waterproofing qualities which I impart to manufactured articles are the resultant of a chemical combination between magnesium silicate consisting of asbestine and sodium silicate when the same are subjected to a temperature of from three hundred degrees (300°) to seven hundred degrees (700°) Fahrenheit.

I produce the composition by mixing the following ingredients in substantially the following proportions; Two hundred (200) gallons of 40° Be. sodium silicate with one hundred (100) gallons of water. To this resulting diluted sodium silicate is mixed by mechanical agitation or otherwise, one thousand (1000) pounds of magnesium silicate consisting of asbestine in powdered form. If a black product is desired, lampblack may be added to the above mixture.

The manufactured article, consisting of asbestos board, asbestos air cell covering, pipe covering or other like fire-proof product, is immersed in the above described mixture, and after draining, is dried out thoroughly in a dry-house or by any other suitable means. When dry, it is placed in an oven and subjected to a heat not exceeding 700° Fahrenheit. During this heating process a chemical union takes place between the magnesium silicate consisting of asbestine and the sodium silicate, thereby producing a sodium magnesium silicate. This forms a compound which is insoluble in water.

The formula for the reaction is as follows: sodium silicate plus asbestine equals sodium magnesium silicate and water:

$$Na_4SiO_4 + H_2Mg_3O_8Si_2H_2O = (Na_4SiO_4)(Mg_3O_7Si_2) + 2H_2O$$

The use of sodium silicate alone when coated over the asbestos product will not result in an absolutely water-resisting compound, even when baked at the required temperature since the chemical union between the sodium silicate and asbestos is not sufficiently complete and will not resist the action of water over ten hours.

The use of asphalts, linseed oil products, or other water repellent substances will yield a waterproof material, but at the same time, use is made of an inflammable ingredient, and the fireproof quality is thereby destroyed. On the other hand, by the use of my invention, the magnesium silicate consisting of asbestine and sodium silicate being mineral products, are fireproof, and on baking, produce chemically an insoluble sodium magnesium silicate. By producing this insoluble silicate in and on the surfaces of the already formed asbestos product which is fireproof, the latter is also made waterproof, thereby forming a combined fireproof and waterproof material or article.

By forming a surface of the character described upon the asbestos board or other asbestos article, the union of ingredients forming the insoluble sodium magnesium silicate thus heated, also unites, and firmly adheres to the asbestos material. This combination forms a superior product, and one which may be subjected to water or heat indefinitely, the same being proof against either.

One of the advantages of my composition is the economy in its production.

I claim:

1. A fireproof and waterproof composition consisting of a union of magnesium silicate asbestine and sodium silicate formed at a temperature of from 300° to 700° Fahrenheit.

2. An asbestos article coated with a waterproof and fireproof compound consisting of a union of magnesium silicate asbestine and sodium silicate formed at a temperature of from 300 degrees to 700 degrees Fahrenheit.

3. The process of making the herein described fireproof and waterproof composition, which consists in preparing a mixture of water, sodium silicate and magnesium silicate asbestine in powdered form, then immersing an asbestos article therein, then drying the immersed article, and then subjecting it to a temperature of from 300° to 700° Fahrenheit.

4. The herein described fireproof and waterproof composition, consisting of ingredients in substantially the following proportions: 200 gallons of 40° Be. sodium silicate mixed with 100 gallons of water, and 1000 pounds of magnesium silicate asbestine in powdered form, substantially as set forth and for the purposes specified.

5. The herein described process which consists in mixing sodium silicate of 40° Be. with water, then mixing the resulting diluted sodium silicate with magnesium silicate asbestine in powdered form, then adding lamp-black to said mixture, then immersing an asbestos article in said mixture, then drying said article, and then subjecting the immersed article to a temperature of from 300° to 700° Fahrenheit, substantially as set forth and for the purposes specified.

CARL J. PATER.

Witnesses:
JAMES N. RAMSEY,
WILLIAM J. MOELLER.

Copies of this patent may be obtained for five cents each, by addressing the "Commissioner of Patents, Washington, D. C."